| United States Patent [19] | [11] Patent Number: 5,059,646 |
| Morioka et al. | [45] Date of Patent: Oct. 22, 1991 |

[54] COMPOSITION WHICH CONTAINS A POLYPHENYLENE ETHER RESIN AND POLYAMIDE

[75] Inventors: Masataka Morioka; Hiromi Ishida, both of Moka, Japan

[73] Assignee: General Electric Co., Selkirk, N.Y.

[21] Appl. No.: 450,142

[22] Filed: Dec. 13, 1989

[30] Foreign Application Priority Data

Dec. 13, 1988 [JP] Japan .................................. 63-312820

[51] Int. Cl.$^5$ ........................ C08K 5/52; C08L 71/12; C08L 77/06
[52] U.S. Cl. .................................... 524/142; 524/127; 524/141; 524/143; 524/144; 524/147; 524/150; 524/151; 524/500; 524/508; 524/514; 525/68; 525/391; 525/397; 525/905
[58] Field of Search ................. 525/391, 397, 905, 68; 524/141, 142, 143, 147, 151, 127, 150

[56] References Cited

U.S. PATENT DOCUMENTS 4,433,088  2/1984  Haaf et al. ............................ 525/68

FOREIGN PATENT DOCUMENTS 3644208  7/1987  Fed. Rep. of Germany ...... 525/391

*Primary Examiner*—Jacob Ziegler
*Attorney, Agent, or Firm*—Francis T. Coppa; Stanley Sacks; David B. Bernstein

[57] ABSTRACT

An improved thermoplastic resin composition is described, containing polyphenylene ether resin, polyamide resin, and certain organophosphorus compounds. Particular examples of the organophosphorus compounds are dimethyloxazolinylmethylbisvinylphenyl phosphate and bis(dimethyloxazolinylmethyl)vinylphenyl phosphate. The compositions are characterized by excellent mechanical properties and oil resistance.

10 Claims, No Drawings

COMPOSITION WHICH CONTAINS A POLYPHENYLENE ETHER RESIN AND POLYAMIDE

DETAILED EXPLANATION OF THE INVENTION

1. Industrial Application Fields of the Invention

The present invention concerns a resin composition which contains polyphenylene ether and polyamide and characterized by excellent mechanical properties and oil resistance.

2. Precedent Techniques of the Invention

Although polyphenylene ether exhibits various excellent properties (e.g., high heat resistance as well as excellent strength, electrical properties, and dimensional precision), said resin is easily degraded by aromatic hydrocarbons (e.g., benzene, etc.) or halogenated hydrocarbons (e.g., Triclene, etc.). Since the molding efficiency is inferior, furthermore, said resin is seldom used as a single molded product.

To improve the molding efficiency of polyphenylene ether, attempts have been made to mix a polystyrene resin. If this method is implemented, the molding efficiency is improved, but since the polystyrene resin is also degraded by aromatic hydrocarbons (e.g., benzene, etc.) or halogenated hydrocarbons (e.g., Triclene, etc.), it is impossible to improve the solvent resistance by adding said polystyrene resin.

Attempts have also been made to add a thermoplastic polyamide resin to simultaneously improve the molding efficiency and solvent resistance. Since the miscibility between the polyphenylene ether and thermoplastic polyamide is inferior, however, the mechanical strength of a molded product derived from the resulting mixture is inevitably inferior.

Attempts have also been made to enhance the dispersibility between the polyphenylene ether and polyamide by adding a polymer which has been obtained by reacting an epoxy group-containing polyphenylene ether with a polyester (see Japanese Kokoku Patent No. Sho 63[1988]-125568).

PROBLEMS TO BE SOLVED BY THE INVENTION

The foremost objective of the present invention is to provide a resin composition which contains a polyphenylene ether and polyamide and which yields a molded product characterized by excellent mechanical strength (especially the impact resistance) as well as superb solvent resistance.

MECHANISM FOR SOLVING THE PROBLEMS

The present inventors have discovered that the mechanical strength of said molded product can be significantly improved by adding a phosphorus-containing compound which contains an intramolecular oxazoline residue and an unsaturated bond.

Briefly, the present invention concerns a resin composition which is obtained by adding 0.05-30 parts by weight of an organophosphorus compound represented by the following formula I:

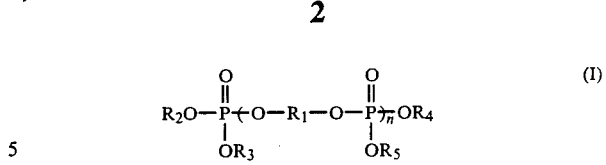

(in which $R_1$-$R_5$ are selected from among aliphatic hydrocarbon residues containing 2-12 carbon atoms, aryl groups containing 6-14 carbon atoms, alkyl-substituted aryl groups, aralkyl groups, and corresponding divalent residues; said groups may also be substituted with halogen atoms, and if there are two or more groups corresponding to $R_1$, they may be identical to or different from one another; two groups selected from among $R_1$-$R_5$ may be bonded and form a ring; at least one member selected from among $R_1$-$R_5$ is a carbon-carbon unsaturated double bond or triple bond, and at least one member selected from among $R_1$-$R_5$ is an oxazoline residue; n is an integer of 0-5) to a mixture consisting of 5-90 parts by weight of a polyphenylene ether resin and 10-95 wt % of a polyamide resin (total weight of said mixture: 100 parts by weight).

As polyphenylene ether component of the present invention, conventionally known resins can be used. For example, homopolymers or copolymers obtained by oxidizing and polymerizing one or more monocyclic phenol compounds represented by the following general formula:

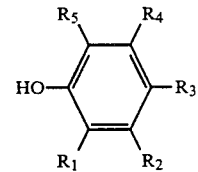

(in which $R_1$-$R_5$ are selected from among a hydrogen atom, halogenated hydrocarbon groups, hydrocarbon groups, and substituted hydrocarbon groups) can be appropriately used.

Concrete examples of such polymers include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. An especially desirable polyphenylene ether resin is poly(2,6-dimethyl-1,4-phenylene) ether. As a polyphenylene ether copolymer, a copolymer in which the aforementioned polyphenylene ether repetition unit is partially substituted with an alkyl-trisubstituted phenol (e.g., 2,3,6-trimethylphenol, etc.) can be used. It is also possible to use a copolymer in which a styrene compound is grafted with said polyphenylene ether. As such a styrene-grafted polyphenylene ether, a copolymer obtained by graft-polymerizing a styrene compound (e.g., styrene, α-methylstyrene, vinyltoluene, chlorostyrene, etc.) with the aforementioned polyphenylene ether can be appropriately used.

It is desirable that the specific viscosity of the polyphenylene ether of the present invention (which is measured in a chloroform solvent at 30° C.) be 0.15-0.65 dL/g, preferably 0.30-0.60 dL/g. If the specific viscosity is lower than 0.15, it is undesirable in that the resulting composition is inevitably brittle and the mechanical strength is low. If the specific viscosity exceeds 0.65, on the other hand, the viscosity difference of the polyphenylene ether and the thermoplastic polyamide resin is too large. Thus, it is difficult to attain a satisfactory dispersibility, and it is difficult to attain the objectives of the present invention.

As the polyamide of the present invention, arbitrary conventionally known polyamides can be used. Concrete examples include polycaproamide (nylon 6), polyhexamethyleneadipamide (nylon 6,6), polyhexamethylenesebacamide (nylon 6,10), polyhexamethylenedodecamide (nylon 6,12), polyundecanamide (nylon 11), polydodecanamide (nylon 12), and copolymerized or condensed polyamides consisting principally of the aforementioned compounds.

It is desirable that the relative viscosity of said polyamide, which is measured in a 98% sulfuric acid solution according to the procedures specified in JIS K-6810, be 1.5–6.5, more preferably 1.8–6.0, or most preferably 2.0–5.5. If the relative viscosity is lower than 1.5, the resulting composition is inevitably brittle, and it is undesirable since the mechanical strength is also inferior. If the relative viscosity exceeds 6.5, the melt viscosity of the polyamide is too high, and it is impossible to attain a satisfactory dispersibility after mixing.

The aforementioned compound of the present invention represented by formula I, which contains unsaturated bond and an oxazoline residue

(II)

can be manufactured according to the following procedures:

After phosphorus oxychloride, which is represented by the following formula III, and vinylphenol, which is represented by the following formula IV, are reacted to synthesize a compound represented by the following formula V:

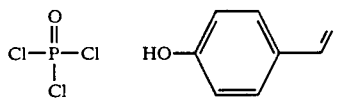

(III)        (IV)

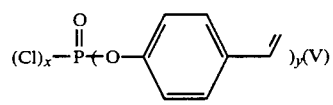
(V)

(in which x is 1 or 2, the sum of x and y are 3; is a residue which contains a carbon-carbon unsaturated bond), and if said compound V is reacted with a compound represented by the following formula VI:

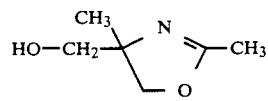
(VI)

the compound of the present invention represented by the following formula VII is obtained:

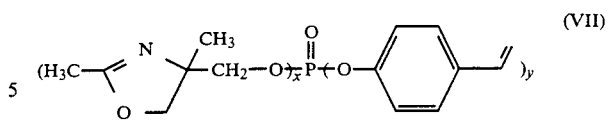
(VII)

Two or more members selected from among $R_1$–$R_5$ in formula I may be mutually bonded and form a ring which contains an ozazoline residue. In other words, a compound characterized by the following structure:

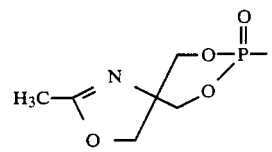

can also be used.

The following are representative examples of examples represented by formula I, although these compounds in no way constitute an exhaustive list:

1. Dimethyloxazolinylmethylbisvinylphenyl phosphate ($n=0$; $R_2$=dimethyloxazolinylmethyl; $R_3=R_4$=vinylphenyl).

2. Bis(dimethyloxazolinylmethyl)vinylphenyl phosphate ($n=0$; $R_2=R_3$=dimethyloxazolinylmethyl; $R_4$=vinylphenyl) (in the aforementioned description, dimethyloxazolinylmethyl=

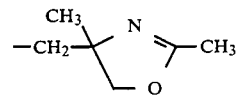

and vinylphenyl= 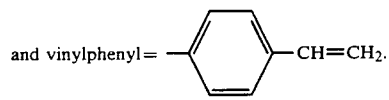.

3. Bis(dimethyloxazolinylmethyl)-4-maleimidephenyl phosphate ($n=0$; $R_2=R_3$=dimethyloxazolinylmethyl; $R_4$=4-maleimidephenyl).

4. Dimethyloxazolinylmethylbis(4-maleimidephenyl) phosphate ($n=0$; $R_2$=dimethyloxazolinylmethyl; $R_3=R_4$=4-maleimidephenyl) (in the aforementioned description, 4 maleimidephenyl=

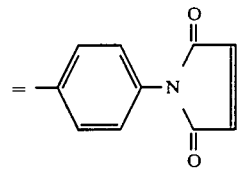

5. Dimethyloxazolinylmethylbis(2-methacryloxyethyl) phosphate ($n=0$; $R_2$=dimethyloxazolinylmethyl; $R_3=R_4$=2-methacryloxyethyl).

6. Bis(dimethyloxazolinylmethyl)-2-methacryloxyethyl phosphate ($n=0$; $R_2=R_3$=dimethyloxazolinylmethyl; $R_4$=2-methacryloxyethyl) (in the aforementioned description, 2-methacryloxyethyl=

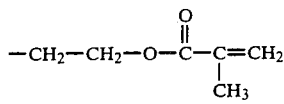

As far as the present invention is concerned, it is necessary that the weight ratio between the polyphenylene ether resin and the polyamide resin be 5-90:95-10, preferably 20-80:80-20. If the quantity of the polyphenylene ether resin is less than the aforementioned ratio, the heat resistance of the resulting molded product is inferior. If the quantity of the polyamide resin is less than said range, the solvent resistance is inferior. It is necessary that the quantity of the organophosphorus compound represented by formula I with respect to 100 parts by weight of the combined weights of the polyphenylene ether resin and polyamide resin be 0.05-30 parts by weight, preferably 0.1-10 parts by weight. If the quantity added is less than said range, it is impossible to attain the objective effects of the present invention (i.e., it is impossible to enhance the miscibility between the two resins and to enhance the mechanical properties of the resulting molded product). If the quantity added exceeds said range, on the other hand, the mechanical properties deteriorate.

When the resin composition of the present invention is manufactured, the aforementioned components can be mixed by an arbitrary order by a conventional method. In a representative format, the individual components are dispersed and mixed using a high-speed mixer (e.g., tumble mixer, Henschel mixer, etc.) and then melt-mixed using an extruder, Banbury mixer, roll, etc.

When the resin composition of the present invention is heated, the unsaturated bond in the compound represented by formula I is bonded with the polyphenylene ether resin. Thus, the oxazoline residue is presumably bonded with the polyamide resin. When the resin composition of the present invention is manufactured, the following formats can be selected: (1) a format in which the polyphenylene ether resin, polyamide resin, and the compound represented by formula I are simultaneously melt-mixed; (2) a format in which the polyphenylene ether resin and the compound represented by formula I are melt-mixed and in which the resulting mixture is melt-mixed with the polyamide resin; (3) a format in which the polyamide resin and the compound represented by formula I are melt-mixed and in which the resulting mixture is melt-mixed with the polyphenylene ether resin; (4) a format in which a mixture consisting of the two resins is melt-mixed with the compound represented by formula I. Thus, there are no restrictions on the mixing order.

The resin composition of the present invention, furthermore, may also contain various other components. For example, organic peroxides may be added to accelerate the reaction between the compound represented by formula I and the polyphenylene ether resin. Concrete examples of such organic peroxides include benzoyl peroxide, dicumyl peroxide, t-butyl hydroperoxide, cumene hydroperoxide, etc.

The resin composition of the present invention, furthermore, may also contain a polystyrene resin which is miscible with polyphenylene ether. Concrete examples of such polystyrene resins include homopolymers derived from styrene or its derivatives, styrene polymers which have been modified by mixing or interacting [sic] natural or synthetic elastomers (e.g., polybutadiene, polyisoprene, butyl rubber, EPDM rubber, ethylene-propylene copolymer, natural rubber, polysulfide rubber, polyurethane rubber, epichlorohydrin, etc.), and styrene-containing copolymers (e.g., styrene-acrylonitrile copolymer (SAN), styrene-butadiene copolymer, styrene/ethylene-propylene copolymer, styrene/ethylene-butylene copolymer, styrene-maleic anhydride copolymer, styrene-acrylonitrile-butadiene copolymer (ABS), and a copolymer consisting of poly-$\alpha$-methylstyrene, ethylvinylbenzene, and divinylbenzene). In particular, the polystyrene homopolymer and a rubber-modified polystyrene which has been obtained by mixing or grafting 3-30 wt %, preferably 4-12 wt %, of a polybutadiene rubber or EPDM rubber are especially desirable as the resin of the present invention.

There are no special restrictions on the mixing ratio between the polyphenylene ether resin and the styrene polymer. Generally speaking, however, a ratio of 5-100:95-0 is especially desirable.

Ordinary elastomers which are highly miscible with polyamide may also be added to the resin composition of the present invention.

If necessary, furthermore, various additives or fillers may also be added to the resin composition of the present invention in consideration of certain objectives. Concrete examples of such additives include stabilizers (e.g., steric hindered phenols, organophosphites, phosphonites, phosphonous acid, cyclic phosphonites, hydrazine derivatives, amine derivatives, carbamate derivatives, thioethers, phosphoric triamide, benzoxazole derivatives, metal sulfides, etc.), ultraviolet absorbents (e.g., benzotriazole derivatives, benzophenone derivatives, salicylate derivatives, steric hindered amines, oxalic diamide, etc.), lubricants (e.g., olefin wax, fatty acid metal salts, fatty acid amides, etc.), bromine-containing or phosphorus-containing flame retardants (e.g., decabromobiphenyl, pentabromotoluene, decabromobiphenyl ether, etc.), pigments (e.g., titanium oxide, zinc oxide, carbon black, etc.), inorganic fillers (e.g., glass beads, glass fiber, wallastonite, mica, talc, clay, calcium carbonate, silica, etc.), metal flakes (e.g., copper, nickel, aluminum, zinc, etc.), metal fibers (e.g., aluminum fiber, aluminum alloy fiber, brass fiber, stainless steel fiber, etc.), and organic fillers (e.g., carbon fiber, aromatic polyamide fiber, etc.). The optimum quantities of these additives depend on the types of compounds used as well as application objectives.

In the paragraphs to follow, the contents of the present invention will be explained in further detail with reference to application examples.

APPLICATION EXAMPLES

Poly(2,6-dimethyl-1,4-phenylene) ether (specific viscosity: 0.46 dL/g in chloroform at 30° C.) was used as polyphenylene ether (PPO) in subsequent application examples.

Nylon 6 with a molecular weight of approximately 13,000 was used as a polyamide.

As a phosphorus-containing compound represented by formula I, the compound represented by formula VII (mixture of compounds in which x values are 1 and 2) was used.

In some of the examples, SEBS (KG 1651, manufactured by Shell Chemical Co.) was used as a styrene elastomer.

A resin composition characterized by one of the compositions shown in the table below (parts by weight) was prepared. After the individual components shown in the table had been sufficiently dispersed and mixed in a Henschel mixer, the resulting mixture was melt-mixed in a 50-mm biaxial screw extruder at a cylinder temperature of approximately 280° C. Thus, a pellet was obtained. The resulting pellet was injection-molded under the following conditions. Thus, a physical property measurement test piece was obtained: cylinder temperature: 260° C.; injection pressure: 700 kg/cm$^2$; mold temperature: 80° C.

The impact resistance was evaluated by measuring the Izod impact strength (with a notch) according to the procedures specified in ASTM D 256.

The solvent resistance was evaluated by the naked eye after the test piece ($\frac{1}{8} \times \frac{1}{2} \times 2.5''$) had been immersed in benzene at 23° C. for 1 hour.

|     |           | (1) 1 | (2) 1 | (1) 2 | (2) 2 | (1) 3 | (2) 3 |
|-----|-----------|-------|-------|-------|-------|-------|-------|
| (3) |           | 60    | 60    | 50    | 50    | 50    | 50    |
| (4) |           | 40    | 40    | 50    | 50    | 40    | 40    |
| (5) | (VII)     | 2     | —     | 2     | —     | 2     | —     |
| SEBS |          | —     | —     | —     | —     | 10    | 10    |
| (6) | (Kg·cm/cm) | 3.8  | 1.6   | 4.3   | 1.8   | 20.6  | 2.8   |
| (7) |           | (8)   | (8)   | (8)   | (8)   | (8)   | (8)   |

Key:
(1) Application Example
(2) Comparative Example
(3) Polyphenylene ether
(4) Polyamide
(5) Compound represented by formula VII
(6) Izod impact strength
(7) Solvent resistance
(8) Excellent As the foregoing explanations clearly demonstrate, it is obvious that the impact resistance of the molded product derived from the resin composition of the present invention is significantly improved.

We claim:

1. A resin composition which comprises:
   a) first component which comprises mixture of about 5-90 parts by weight of a polyphenylene ether resin and about 95-10 parts by weight of a polyamide resin; and
   b) about 0.05-30 parts by weight relative to the first compound of a second component of the type

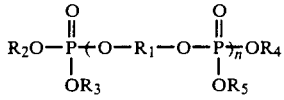

wherein n is an integer of 0-5, $R_1-R_5$ is selected from the group consisting of aliphatic hydrocarbon residues containing 2-12 carbon atoms, aryl groups containing 6-14 carbon atoms, alkyl-substituted aryl groups, aralkyl groups and corresponding divalent residues, wherein at least one member selected from the group consisting of the $R_1-R_5$ contains a carbon-carbon unsaturated double bond or triple bond, and further wherein at least one member selected from the group consisting of the $R_1-R_5$ is an oxazoline residue.

2. The composition of claim 1 wherein, when two or more groups correspond to $R_1$, each of such groups is identical.

3. The composition of claim 1, wherein two groups selected from $R_1-R_5$ are bonded to form a ring.

4. The composition of claim 1 wherein at least one of the groups selected from $R_1-R_5$ is substituted with at least one halogen atom.

5. The composition of claim 1 wherein the first component preferably comprises approximately 20-80 parts by weight of a polyphenylene ether resin and approximately 80-20 parts by weight of a polyamide resin.

6. The composition of claim 1 wherein the second component preferably is present in an amount of approximately 0.1-10 parts by weight relative to the first component.

7. The composition of claim 1 wherein the second component is selected from the group consisting of:
dimethyloxazolinylmethylbisvinylphenyl phosphate,
bis(dimethyloxazolinylmethyl)vinylphenyl phosphate,
bis(dimethyloxazolinylmethyl)-4-maleimidephenyl phosphate,
dimethyloxazolinylmethylbis(4-maleimidephenyl) phosphate,
dimethyloxazolinylmethylbis(2-methacryloxyethyl) phosphate, and
bis(dimethyloxazolinylmethyl(2-methacryloxyethyl phosphate.

8. The composition of claim 1 wherein the polyphenylene ether resin comprises poly(2,6-dimethyl-1,4-phenylene) ether.

9. The composition of claim 1 wherein the polyphenylene ether comprises a copolymer partially substituted with 2,3,6-trimethylphenol.

10. The composition of claim 1 wherein the polyamide resin is selected from the group consisting of nylon 6; nylon 6,6; nylon 6,10; nylon 6,12; nylon 11; nylon 12 and copolymerized or condensed polyamides of such resins.

* * * * *